United States Patent [19]

Valyi

[11] 4,405,556
[45] Sep. 20, 1983

[54] PROCESS AND APPARATUS FOR FORMING ORIENTED, BLOWN ARTICLES

[76] Inventor: Emery I. Valyi, 5200 Sycamore Ave., Riverdale, N.Y. 10471

[21] Appl. No.: 343,172

[22] Filed: Jan. 27, 1982

[51] Int. Cl.³ .............................................. B29C 17/07
[52] U.S. Cl. .................................. 264/513; 264/537; 425/523; 425/526; 425/533; 425/534
[58] Field of Search ............... 264/535, 537, 538, 513, 264/530, 532; 425/526, 533, 534, 523

[56] References Cited

U.S. PATENT DOCUMENTS

| | | | |
|---|---|---|---|
| 4,140,464 | 2/1979 | Spurr et al. | 425/534 X |
| 4,197,073 | 4/1980 | Rees et al. | 425/534 X |
| 4,219,526 | 8/1980 | Mehnert | 425/526 X |
| 4,259,056 | 3/1981 | Rees et al. | 264/537 X |
| 4,313,720 | 2/1982 | Spurr | 425/526 |

*Primary Examiner*—Jan H. Silbaugh
*Attorney, Agent, or Firm*—Bachman and LaPointe

[57] ABSTRACT

Method and apparatus for the preparation of oriented hollow articles of moldable organic plastic material which is characterized by a rapid operating cycle and an inexpensive procedure. The disclosure teaches a streamlined operating cycle utilizing a reduced number of blow molds while retaining high productivity.

15 Claims, 3 Drawing Figures

PROCESS AND APPARATUS FOR FORMING ORIENTED, BLOWN ARTICLES

BACKGROUND OF THE INVENTION

This invention relates to the art of forming an oriented hollow article of a moldable organic plastic material wherein the plastic material is susceptible to improvement in properties by orientation. A principal object of the present invention is to obtain a rapid operating cycle despite the fact that the particular plastic may require prolonged residence in a tempering station which would result in a prolonged operating cycle. It is also an objective of the present invention to enable the use of a reduced number of blow molds while retaining high productivity and a streamlined operation.

The art teaches various methods for obtaining blow molded articles of organic plastic material from a pressure molded parison, such as in U.S. Pat. Nos. 3,349,155 and Re. 27,104. Generally these methods are characterized by forming a parison in a parison mold on a core, placing said formed parison into a blow mold and expanding said parison in the blow mold by means of fluid pressure.

While the blow molding operation tends to impart orientation to the article, the degree and type of such orientation is difficult to control and therefore it is difficult to obtain the advantageous properties in the article that multi-axial orientation is capable of providing. These advantageous properties are provided when orientation is carried out under the most desirable conditions of temperature distribution by stretching and circumferentially expanding said parison.

It is known that the control of orientation depends largely upon the control of the temperature of the parison just prior to orientation. It is found that such temperature control is best obtained by enclosing the parison prior to the orienting step in an environment, such as a mold whose surfaces may provide conductive or radiant heat exchange with the corresponding surfaces of the parison.

Plastic articles exhibiting the properties of multi-axial orientation, e.g., bottles and other hollow containers, are frequently made in two stages. The first of these two stages is the production of the parison usually by injection molding, or by other pressure molding procedures such as compression molding and extrusion. The first stage thus serves to convert the chosen plastic into a parison of predetermined shape, having a wall thickness distribution suitable for the production of the final article shape and usually also having a neck or rim configuration suitable to receive a closure appropriate for the said article.

The parison so made is next subjected to a second stage of operation wherein it is heated to that temperature at which its transformation into the finished article is to take place and, once at that temperature, it is expanded under conditions imparting the desired orientation.

Such two-stage operations are well known in the art. For example, in a machine designated as RHB 5 built by the Cincinnati-Milacron Company, conventional parisons that have been previously injection molded in a conventional manner are passed through parallel banks of infrared heaters, usually while being rotated around their axes to insure improved heating and, upon reaching the desired temperature, placed into a blow mold in which a stretch mandrel extends the length of the parison to a predetermined degree, followed by expanding the extended parison into conformance with the blow mold by means of a pressure fluid. Other similarly acting devices are well known and described, e.g., in the February and March, 1976 issues of *Modern Plastics* (a McGraw-Hill Publication). One such device is known as the Model 650 Machine built by Nissei Plastics Industrial Co., Ltd. of Japan, a schematic description of which is given in U.S. Pat. No. 3,944,643 and U.S. Pat. No. 4,105,391. In that machine, the parison is injection molded and cooled in the injection mold which includes a core, to a temperature at which it is easily removed from said core (according to claim 1 of the above U.S. Pat. No. 3,944,643). The parison is then transferred by means of a neck mold to a heating environment designated as a reheating mold (claim 1) or heating device (Column 1, line 6), in which its temperature is raised to that desired for orientation, by means of external and, if found necessary, also internal heaters which may be the radiant or contacting type. Once the parison reaches the desired temperature, it is transferred to a blow mold in which it is converted into the finished article by stretching and blowing, as above described in connection with the RHB 5 Machine.

The disadvantages of such two-stage operations include a slow cycle due to the fact that the parison must first be cooled from the temperature at which it is molded to near room temperature, only to be heated once more to the relatively high orientation temperature, with a corresponding waste of heat. In addition, heating of the parison is unsatisfactory because, it being made of an organic polymer and hence a poor heat conductor, uniform heating across its wall thickness is very difficult and time consuming to obtain.

In addition to the above two-stage procedures, a single stage operation may be employed, wherein the parison is cooled after having been molded only enough to lower its average temperature substantially to that chosen for orientation and the transformation of the parison into the finished article is carried out, for example, by stretching and blowing, after it has attained a uniform cross-sectional temperature distribution corresponding to the above average temperature, preferably in a tempering mold. Such single stage operation is described in my previous U.S. Pat. No. 3,966,378 according to which the parison is injection or compression molded, cooled to a predetermined, limited degree in the injection or compression mold, transferred by means of the injection core into one or more tempering molds for equalization of its temperature distribution and then transferred into a blow mold for finishing of the final article under conditions of biaxial orientation. Such single stage operation lacks the disadvantages of excessive operating cycle, waste of heat and non-uniform temperature distribution at the time of orientation and it can provide the basis for significant improvement in the operating cycle.

A further improvement is shown in my previous U.S. Pat. No. 4,151,248 according to which the parison is provided in a formable condition at a temperature substantially above that required for orientation of said plastic on a temperature controlled first core in a temperature controlled first mold, for example, an injection mold, with the first core and first mold being held at temperatures substantially below that required for orientation of the plastic. The heat content of the parison is rapidly altered by means of heat exchange with the first core and first mold to result substantially in the parison having an average temperature suited for orientation and with an unequal distribution of temperature resulting across the walls of the parison. The resulting parison is then transferred to a closed environment, for example a tempering mold, for equalizing the temperature distribution within the walls of the parison and to attain a temperature throughout corresponding to the chosen orientation temperature of the plastic.

While this procedure represents a significant improvement, thick parisons still result in excessive time delays for cooling in the injection mold and in the tempering mold.

My copending U.S. patent application Ser. No. 120,266, now U.S. Pat. No. 4,352,777 responds to this problem by providing more than one tempering mold, with the tempering molds in spaced relationship to each other, for retaining and tempering parisons prior to orientation and blowing in a prolonged tempering cycle. However, delays are still attendant upon retention of the parison in the injection mold.

An additional problem in the art is that the process elements of injection blow molding, namely injection of a parison, tempering and transforming of that parison into the final article by blowing and/or stretch blowing, usually demand different time cycles. Thus, molding of the parison may take twice as much time as blowing or stretch blowing.

In the processes usually designated as single-step or continuous, it is known to employ one blow or stretch-blow mold for each parison mold. Recognizing the above discrepancy between the parison forming, tempering and the blowing cycle, it can be seen that the use of equal numbers of parison forming means and blowing means, for example, is wasteful. The blowing or stretch blowing means or molds is costly and as heretofore practiced more of said molds than necessary may be employed. In accordance with U.S. Pat. No. 4,261,949 fewer of said molds are employed, but a cumbersome and inconvenient cycle is employed.

It is, therefore, a principal objective of the present invention to devise a method and apparatus which enables an improved operating cycle.

It is a particular object of the present invention to provide such a method and apparatus which does not interfere with the normal operation of the method and apparatus.

It is a still further object of the present invention to provide a method and apparatus as aforesaid which is capable of achieving the aforesaid advantages without the necessity of constructing an extremely bulky and inefficient apparatus.

It is a further object of the present invention to devise a method and apparatus as aforesaid which attains a streamlined operating cycle with high productivity while utilizing a reduced number of blow molds.

Further objects and advantages of the present invention will appear hereinbelow.

SUMMARY OF THE INVENTION

In accordance with the present invention, it has now been found that the foregoing objects and advantages may be readily obtained and an improved method and apparatus provided.

The method of the present invention deals with the preparation of oriented hollow articles of moldable organic plastic material, mainly poly (ethyleneterephthalate) polymers (PET) in a rapid operating cycle by injection molding a plurality of parisons in a plurality of injection molds, tempering said parisons in at least one tempering mold to obtain uniform orientation conditions, and orienting and expanding the tempered parisons to obtain the hollow articles. The improvement of the present invention comprises: providing a first group of tempering molds containing a number of mold cavities equal to the number of injection mold cavities, wherein said first group is in spaced relationship to said injection molds; transferring said parisons from said injection molds to said first group for tempering; tempering said parisons in said first group; providing a tempered parison storage facility in spaced relationship to said first group and containing means to accommodate parisons equal to the number of cavities in said first group; transferring fully tempered parisons to said facility; providing a number of blow molds for final expansion in spaced relationship to said facility in an amount less than may be accommodated in the injection mold and in said facility; transferring a first number of parisons equivalent to the number of blow molds from said facility to said blow molds for orientation and expansion and orienting and expanding said first number; and transferring at least one second number of parisons equivalent to the number of blow molds from said facility to said blow molds for orientation and expansion and orienting and expanding said second number.

A plurality of groups of tempering molds may of course be provided depending upon the tempering cycle desired. The parison must, however, be fully tempered when it arrives at the tempered parison storage facility since a first number of tempered parisons are first removed therefrom as indicated hereinabove. The second number of tempered parisons is simply maintained in a tempered condition for subsequent removal.

Thus, a preferred method of the present invention comprises: a first and second group of tempering molds containing an equal number of mold cavities, wherein each group is in spaced relationship to the other and to said injection molds; transferring said parisons from said injection molds to said first group for tempering; transferring said parisons from said first group to said second group for continued tempering; providing a tempered parison storage facility in spaced relationship to said second group and containing a number of mold cavities equal to the number of cavities in said second group; transferring fully tempered parisons to said facility; providing a number of blow molds for final expansion in spaced relationship to said facility in an amount less than the number of mold cavities in said facility; transferring a first number of parisons equivalent to the number of blow molds from said facility to said blow molds for orientation and expansion and orienting and expanding said first number; and transferring a second number of parisons equivalent to the number of blow molds from said facility to said blow molds for orientation and expansion and orienting and expanding said second number.

The improved apparatus of the present invention comprises: a first group of tempering molds in spaced relationship to the injection molds, wherein said group contains a number of mold cavities equal to the number of injection mold cavities; means engageable with the parisons for transferring the parisons from the injection molds to said first group for tempering; a tempered parison storage facility in spaced relationship to said first group and containing means to accommodate parisons equal to the number of cavities in said first group;

means engageable with said parisons for transferring fully tempered parisons to the facility; a number of blow molds for final expansion in spaced relationship to the facility in an amount less than may be accommodated in the facility; means engageable with a first number of parisons in the facility equivalent to the number of blow molds for transferring same to the number of blow molds for orientation and expansion; and means engageable with at least one second number of parisons in the facility equivalent to the number of blow molds for transferring same to the number of blow molds for orientation and expansion.

Consonant with the foregoing, a preferred apparatus of the present invention comprises: a first and second group of tempering molds containing an equal number of mold cavities, wherein each group is in spaced relationship to the other end to said injection molds; means engageable with the parisons for transferring the parisons from the injection molds to said first group for tempering; means engageable with the parisons for transferring the parisons from the first group to the second group for continued tempering; a tempered parison storage facility in spaced relationship to said second group and containing a number of mold cavities equal to the number of cavities in said second group; means engageable with said parisons for transferring fully tempered parisons to the facility; a number of blow molds for final expansion in spaced relationship to the facility in an amount less than the number of mold cavities in the facility; means engageable with a first number of parisons in the facility equivalent to the number of blow molds for transferring same to the number of blow molds for orientation and expansion; and means engageable with a second number of parisons in the facility equivalent to the number of blow molds for transferring same to the number of blow molds for orientation and expansion.

In the preferred embodiment the means engageable with the first and second number of parisons is a plurality of stretch-blow cores which form the tempered parisons into oriented, blown articles in the blow molds.

It can be readily seen that the method and apparatus of the present invention obtains significant advantages. Advantage is obtained of the different time cycles of the process elements of injection blow molding, namely injection of a parison and transforming that parison into the final article by stretch blowing. Thus, the present invention uses a fewer number of the costly blowing means or molds while significantly obtaining a streamlined and efficient operating cycle. In accordance with the present invention an improved and rapid operating cycle is obtained which does not involve the use of cumbersome devices.

The present invention is particularly suitable for the production of composite containers. If it is desired to produce a multilayered parison and a multilayered final article, the first core may be provided with a layer of one plastic and a subsequent layer may then be pressure molded therearound in accordance with my U.S. Pat. Nos. 3,349,155, 3,717,544 and 3,719,735. It should be understood, therefore, that where the general description that follows refers simply to parisons, the method and apparatus of the present invention are applicable to multilayered as well as single-layered parisons.

DETAILED DESCRIPTION

Figure 1:
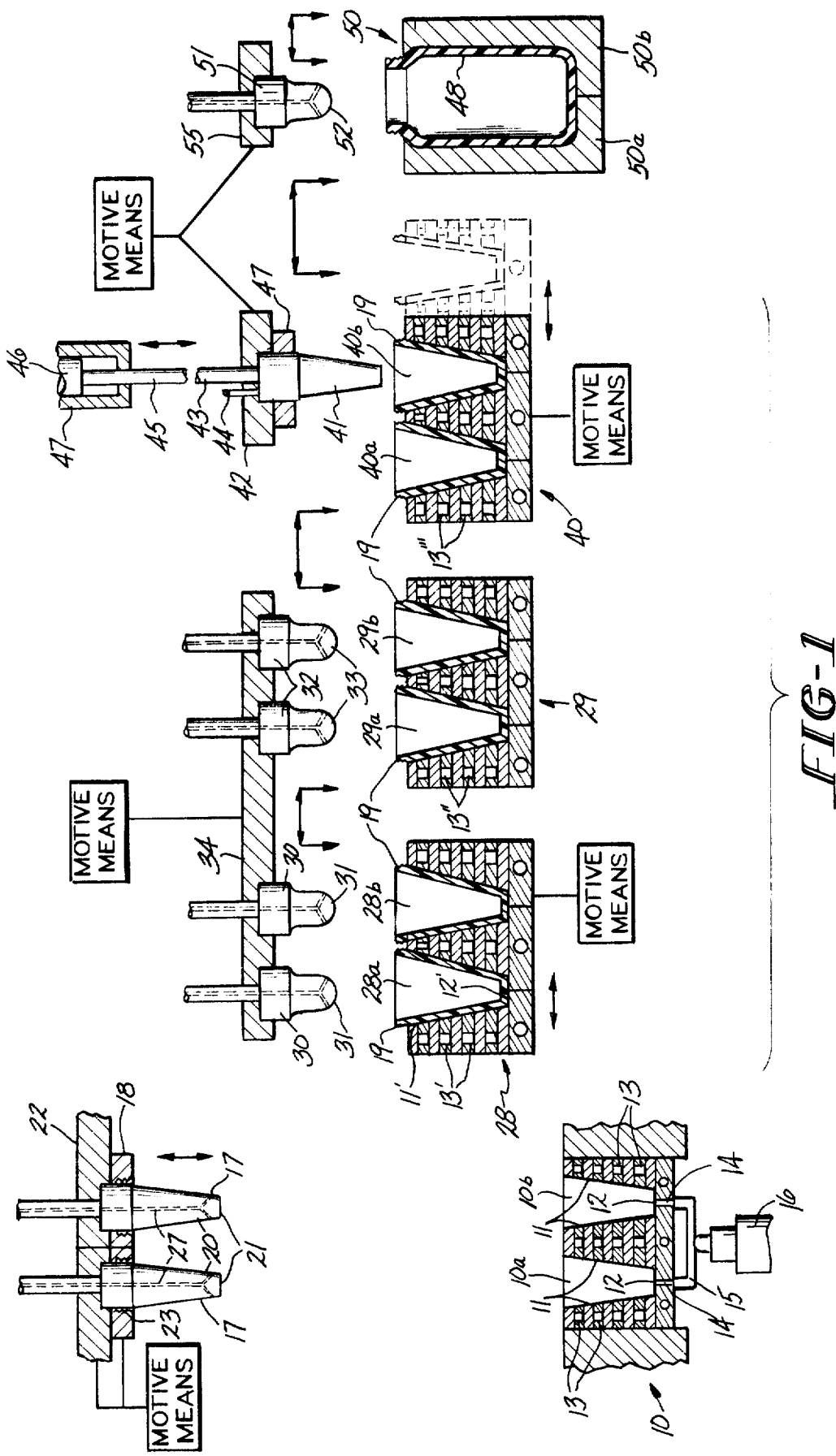
FIG. 1 is a partly schematic elevation, partly in section, illustrating a preferred embodiment of the present invention.

FIG. 1 illustrates one embodiment of the present invention including parison or injection mold 10, having two mold cavities 10a and 10b each having outer walls 11 which are adapted to form the outer surface of the parisons, and each having an end wall 12 shaped to form the end wall of the parisons. The embodiment of two mold cavities in FIG. 1 is chosen for ease of representation and obviously a greater number of these may be employed depending upon requirements. The parison mold 10 is temperature controlled, such as by cooling channels 13 contained therein which are connected to appropriate heat transfer sources (not shown) wherein such temperature control may be arranged in several zones to obtain different temperatures in different regions of the parisons side and end walls. The end walls 12 have injection openings 14 registering with runners 15 which in turn register with an injection nozzle 16 through which the organic plastic material is injected into the mold cavities in a known manner.

The formation of the parisons in accordance with the embodiment illustrated takes place after first cores 17, neck mold 18 and mold 10 are brought into engagement by suitable mechanical means, such as the motive means shown schematically Parison mold 10 is stationary, while cores 17 and neck mold 18 are axially reciprocable in the direction of the arrows into and out of engagement with mold 10 and mold cavities 10a and 10b. It should be understood that the present invention is not limited thereto, as reciprocable parison molds and stationary cores and/or neck molds are encompassed therein. Upon completion of injection through nozzle 16, parisons 19 are formed.

Side walls 20 and ends 21 of cores 17, walls 11 and 12 of parison die 10, and the neck mold 18 constitute die cavities in which the parisons are formed. Cores 17 may be temperature controlled in one or more zones, such as by internal heat exchange circuits known in the art contained therein, which are connected to an appropriate heat transfer source (not shown). Cores 17 are carried by platen 22. The assembly further includes a neck mold 18 in which the neck of the parisons are formed and which may if desired remain engaged with the parisons after core 17 is disengaged from the parison mold, which neck mold may be independently temperature controlled. The neck mold may process threads 23 for defining a threaded opening in the final molded object. The neck mold 18 may be split and opened into sections by suitable mechanical means such as the motive means shown schematically, to simplify release of the parisons, or if the configuration of the neck permits, may be of one-piece construction and, thus, separable from the parisons as a unit.

Parisons 19 which are formed in mold 10 by injection molding are at a temperature substantially above that required for orientation. The temperature of the parisons is preferably rapidly adjusted so that an average temperature close to the one suitable for orientation is obtained without inordinate delay.

In the interest of a rapid operating cycle, it is particularly advantageous to first rapidly alter the heat content of parisons 19 by heat exchange with cores 17 and mold 10 to approach the heat content desired for subsequent operations, even if at the cost of an unequal distribution of temperature in said parisons. This must be followed by substantially equalizing the temperature distribution across the wall thicknesses by causing them subsequently to reside in a suitable environment capable of influencing their temperature, such as tempering molds 10 and at times cores, or other environments known in the art, to avoid a layer-wise pattern of properties in the finished articles corresponding to the known relationship between such properties and the deformation temperatures. This procedure is described in more detail in my U.S. Pat. No. 4,151,248 referred to hereinabove. Thus, for example, as described in said patent, one can form parisons 19 by injection molding, rapidly cool said parisons by heat exchange with cores 17 and mold 10 which will result in a rapid cycle, but will also produce said unequal temperature distribution, followed by substantially equalizing the cross-sectional temperature distribution of said parisons in tempering molds, all in a controlled manner, to impose thereon the temperature profile desired for orientation. Naturally, the parisons remain in the tempering molds, at times supplemented by additional molds like the initial tempering molds into which the parisons may be sequentially transferred, until the necessary desired temperature distribution is obtained. The foregoing provides the considerable advantages of enabling the attainment of a predetermined temperature profile of the parison resulting in optimum conditions for orientation without excessive dwell time in the molds. The parison mold is freed for further use while the tempering molds complete the conditioning of the parison, resulting in an expeditious processing cycle.

However, the operating cycle may still be subject to delays attendant upon the holding time required in the injection mold, since, as long as the injection mold is being occupied by the newly injected parison, the injection mold is not free to form a further parison and cycle delays may result. This is particularly pronounced with relatively thick parisons since longer injection mold delays are then involved.

In accordance with copending application Ser. No. 288,950, the procedure of which may readily be used in the present invention and the disclosure of which is incorporated herein by reference, the parison is prematurely removed from the injection mold and transferred to a holding station for completion of the cooling step normally completed in the injection mold. In accordance with said copending application, the parison is kept in the chilled environment of the injection mold until its inside temperature drops below that which corresponds to the highest rate of crystallization of the given material. The parison is removed from the chilled environment at that time and transferred into the holding station or first tempering mold fast enough, i.e., within that length of time during which little or no crystallization can occur according to the crystallization rate applicable to the inside of the preform, whereby said first tempering mold is held at a temperature that is substantially lower than that of the parison inside. The parison is now removed from the injection mold and transferred into the holding mold. After a dwell which equals that in the injection mold plus the time of transfer, the parison is removed from the said mold and placed into a tempering mold at the same time that the next-made parison is transferred into the holding mold. The parison is kept in the tempering mold long enough to equalize the temperature between its skins and its inside and then transferred into a blow mold for conversion into the bottle shape.

If the time available to cool the parison in one holding mold does not suffice, a second holding mold may continue the cooling function and the tempering mold may then follow for equalization of the parison temperature. Additional tempering molds may of course be added if necessary. How many continuing cooling and equalization steps, and therefore cooling and tempering molds are required depends on the thickness of the parison, all other variables of the molding process being equal, in order to maintain the same operating cycle of the apparatus regardless of the parison thickness.

Referring to FIG. 1, after the formation of parisons 19 in the assembly consisting of mold 10, cores 17 and neck mold 18, the parisons are preferably left therein for the shortest possible time consistent with the foregoing to cool in contact with the said elements of said assembly, each of which is preferably temperature controlled, preferably independently of each other, in order to enable rapid and indeed premature removal from the injection mold as aforesaid in accordance with the preferred embodiment. The temperatures of some of the said elements may be so controlled as to cool portions of the parisons to a low temperature well below that suitable for orientation.

The parisons may be removed from the injection mold before the average temperature is substantially equal to the desired orientation temperature, naturally, with an unequal temperature distribution resulting in the parisons, or allowed to remain in the injection mold until the average temperature is substantially equal to the desired orientation temperature. The parisons are then transferred to the first tempering mold, which may be a holding mold.

Passages 27 may be provided within core 17 communicating with an outside source of pressure fluid (not shown) and may terminate at a valve-like, closeable portion of the core. Core 17 and mold 10 are cooled, as indicated hereinabove, to provide cooling of the adjacent parison surfaces and to assure rapid removal of heat from the parisons. Separation of cores 17 from parison 19 without damage to it may be facilitated by air-pressure stripping of the parison from the core while leaving the neck mold engaged therewith, as described in my aforesaid U.S. Pat. No. 4,242,300. The parisons may be left in mold 10 during such separation in order to prevent damage by the air pressure so introduced. Core 17 and neck mold 18 (or the neck mold alone) with parison 19 engaged thereon are then separated from mold 10, first tempering mold 28, which may be a holding mold, is aligned with the parisons by any desired motive means capable of providing relative lateral movement, and the parisons placed in the mold 28. Mold 28 has temperature controlled cooling elements 13' as mold 10 and two mold cavities 28a and 28b. Also, mold 28 is preferably otherwise similar to mold 10, as having outer walls 11' and end wall 12' and conforming to the shape of parisons 19.

By transfer of parisons 19 into mold 28 the injection mold is freed for the formation of further parisons. As indicated hereinabove, only a single tempering mold may be employed if desired depending upon the tempering characteristics desired; however, in the specific embodiment shown in FIG. 1, two tempering molds are employed. After a first holding period in molds 28, the parisons are transferred to second tempering molds 29 by suitable means for continued tempering, for example, by grippers such as shown in copending U.S. pat. application Ser. No. 163,196, now U.S. Pat. No. 4,351,631, and additional cores shown schematically at 30 which may if desired include internal fluid passageways 31. In the illustrative embodiment shown, gripper 30 removes parisons 19 from mold 28, mold 28 moves into alignment with core 17, and parisons 19 are aligned with molds 29 by lateral movement of grippers 30, said molds 29 containing heating or cooling elements 13", and two mold cavities 29a and 29b, and the parisons are placed in molds 29 by grippers 30. Parisons 19 are thus removed from molds 28 and molds 28 are thereby rendered capable to receive the next parisons from mold 10 while parisons 10 are placed in mold 29.

The parisons, fully tempered, are then transferred from molds 29 to a tempered parison storage facility which may be molds 40 or any storage facility capable of maintaining the tempered condition. Molds 40 contain two mold cavities 40a and 40b and may if desired be tempering molds containing heating elements 13''' similar to molds 28 and 29. Alternatively, as indicated above, molds 40 may be simply holding molds. The transfer occurs by means of grippers 32, which may contain fluid passageways 33, which removes the parisons from molds 29, aligns the parisons with molds 40 by lateral movement of grippers 32, and places same into molds 40.

It should be understood that additional tempering molds may by employed if prolonged tempering is required, as shown in my copending U.S. pat. application Ser. No. 120,266, the disclosure of which is incorporated herein by reference. In accordance with the preferred procedure of said copending application, a plurality of tempering molds are provided and the parisons are transferred from tempering mold to tempering mold for completion of the tempering cycle without delaying the cycle by waiting for tempering to be completed in a single tempering mold.

If desired, parisons 19 may be placed in better conformance with molds 28 and 29 by the exertion of fluid pressure within the parisons.

Grippers 30 and 32 are carried by common platen 34 since they operate on a common cycle, although separate carrying means may be provided.

Core 41 is carried by platen 42 and may be provided with temperature control means. Since axial stretching of the parisons is desired, core 41 includes a stretch and blow assembly which comprises a mandrel extension 43 which is reciprocable as indicated by the arrow to axially extend the parison 19 and at the same time admit pressure fluid inside the parison through passageway 44. An actuating means is shown which comprises a push rod 45 which engages extension 43, and which is connected to a piston 46 housed within a cylinder 47 which may, for example, be responsive to hydraulic pressure exerted by a pump, now shown. By controlling the flow of fluid into cylinder 47, the speed of piston 46 and therefore of the movable portion of core 41 may be controlled to stretch the parison at the speed best suited for the temperature of the parison. Such actuating means is merely illustrative of one manner of operation, as other actuating means known in the art can be employed herein. If a highly oriented article is not desired, the axial extension operation may be dispensed with.

After the final holding sequence, the parisons are separated from mold 40 as by retaining it on core 41 by means of grippers 47, if necessary.

In the embodiment shown in the drawing, core 41 is situated in spaced relationship to cores 17, 30 and 32 and molds 40 are situated in spaced relationship to molds 10, 28 and 29 and a finish or blow mold 50, to enable simultaneous performance of the plural functions. Alternative alignments, as by means of neck molds, may be used, so long as the concurrent pursuit of the injection holding cycle, tempering and final forming processes with separate parisons may be accomplished. An ejection core 51 optionally containing fluid passageway 52 may be used to remove the fully expanded article 48 from mold 50. The ability to concurrently conduct the various operations outlined herein comprises one of the notable advantages of the invention. The simultaneous formation, holding, transfer, tempering, final expansion and finished article removal is envisioned in accordance with the present invention.

As shown in FIG. 1, there are less blow molds than the number of mold cavities in each group of tempering or holding molds. In the embodiment illustrated in FIG. 1, there is a single blow mold 50, while each group of tempering or holding molds contain two mold cavities. Therefore, the number of means for transferring parisons 19 from molds 40 to molds 50 should correspond to the number of blow molds, in this case a single blow mold is shown so that a single means for transferring parisons 19 is provided. Naturally, if there are move blow molds there would be correspondingly more tempering or holding molds and an appropriate number of transferring means. Also, in the embodiment shown stretch-blow core 41 is shown as the means for transferring the parisons; however, naturally, a separate transfer means may be provided and the stretch-blow core maintained above blow mold 50, or other obvious variations provided.

Thus, in the embodiment shown stretch-blow core 41 transfers a parison 19 from cavity 40b into blow mold 50 by axial, lateral and axial movement as shown in the arrows in FIG. 1. As indicated hereinabove, a core or article removal plug 51 may be provided for removing the finished article and may be positioned in lateral, spaced relationship to core 41. Therefore, when core 41 engages parison in mold 40b, the removal plug engages the finished article 48 in mold 50. As shown by the arrows, the core 41 and plug 51 are axially and laterally reciprocable so that cores 41 and 51 simultaneously transfer their respective articles by a combination of axial, lateral and axial movements. If desired, core 51 may be carried by common platen 42 or separate platen 52.

Parison 19 is then received in mold 50, which may be split for convenience, with its temperature having been adjusted as described hereinabove. Parison 19 is usually axially extended to the bottom of mold 50 by advancement of the movable portion of mandrel 43 by means of push rod 45 at a predetermined rate. Thus, the present invention may controllably guide the parison longitudinally while final blowing occurs and thereby produce orientation in the axial direction as well as the orientation produced by blowing. It can be seen that the temperature of the parison preparatory to stretching and blowing may be properly and conveniently controlled by the respective tempering environments, and also by cores if desired. While stretching occurs, passageway 44 is kept open to provide pressure equalization in the inside of the parison with the atmosphere to prevent collapse of the parison due to the vacuum created inside same as its inside volume increases during stretching.

The parison is fully expanded to conform to the configuration of finishing mold 50, to form the final object 48, which in the embodiment illustrated herein is an open-ended container. Naturally, a wide variety of shapes may be prepared as the commercially known shapes which may be a bottle, a jar or a cup-shape. Full expansion is accomplished by supplying fluid under pressure through passageway 44 into the interior of parison 19, or at times and at various rates into the interior of the parison while it is being extended.

In the embodiment illustrated herein, finishing or blow mold 50 is longitudinally split into two sections labeled 50a and 50b, which may reciprocate in and out of communication by an actuating means, not shown, such as for example a hydraulic cylinder. Thus, sections 50a, and 50b may be parted by an amount sufficient to permit removal of article 48 by core 51.

After a first parison 19 is removed from mold 40b by core 41, molds 40 reciprocate laterally so that mold 40a with an additional parison 19 contained therein occupies the position previously occupied by mold 40b and mold 40b occupies the position shown in dashed lines in FIG. 1. Therefore, upon return of core 41 to the position shown in FIG. 1 a further parison 19 in mold 40a will be located immediately beneath core 41 for transfer to blow mold 50 by means of core 41 in the same manner discussed hereinabove. Thus, a single blow mold is utilized for two holding or tempering molds. Naturally, the cycle time for transferring parisons 19 from mold 40 to mold 50 will be such that two parisons 19 are transferred from mold 40 to mold 50 in a time period corresponding to the transfer time from molds 28 to 29 and from molds 29 to 40. Thus, after the second parison has been transferred from mold 40 to mold 50, mold 40 reciprocates laterally to the original position shown in solid lines in FIG. 1 so that mold 40 is ready to receive two additional parisons 19 from mold 29 in the manner described hereinabove.

Figure 3:
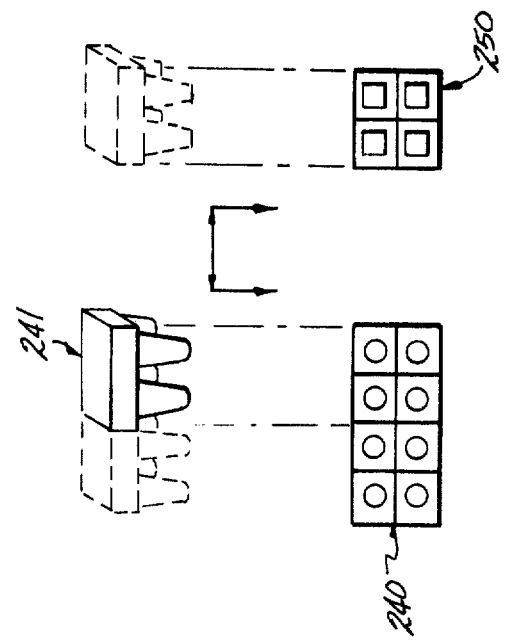
FIGS. 2 and 3 are schematic representations of alternate embodiments of the present invention.
Figure 2:
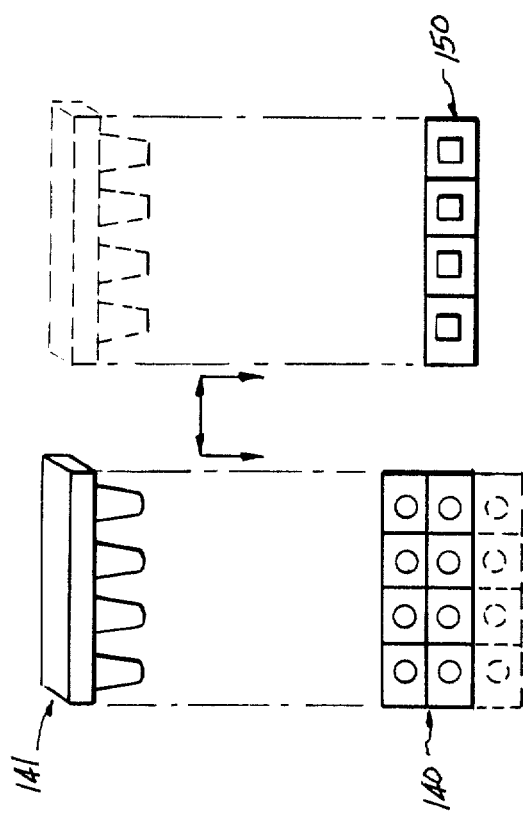

Naturally, other variations within the scope of the present invention may be readily utilized. FIGS. 2 and 3 represent schematic representations of alternate embodiments of the present invention showing views of the tempered parison storage facility and the final blow station. In accordance with the embodiment of FIG. 2, storage facility 140 contains eight mold cavities and blow molds 150 contain four blow mold cavities. Thus, it can be seen that the number of blow molds for final expansion in spaced relationship to the tempered parison storage facility is provided in an amount less than the number of mold cavities in said facility. Four stretch-blow cores 141 are shown above the mold cavities in facility 140 in a manner similar to FIG. 1. Cores 141 transfer four parisons from facility 149 to molds 150 in a manner similar to FIG. 1 by axial, lateral and axial movement, facility 140 is laterally moved so that a second set of mold cavities occupies the position previously occupied by the first mold cavities and the cycle repeats. In the embodiment shown in FIG. 3, tempered parison storage facility 240 is provided with eight mold cavities in a manner after FIG. 2 and blow molds 250 are also similarly provided with four mold cavities. However, it can be seen that facility 240 is stationary and stretch-blow cores 241 first transfer a group of four parisons to blow molds 250 and subsequently move into alignment with a second group of parisons in said facility as shown in dashed lines in FIG. 3 so that the second group of parisons may be transferred to the blow molds. Thus, alignment of the respective groups of parisons in FIG. 3 is accomplished by relative movement of the transfer means rather than the storage facility.

It is clear in accordance with the present invention that a greatly improved operating cycle is obtained. The components of the process and apparatus of the present invention are simple, convenient and expeditious and effectively operate in a versatile way with utilization of considerably fewer blow molds than would ordinarily be employed.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for the preparation of oriented hollow articles of moldable organic plastic material in a rapid operating cycle by injection molding a plurality of parisons in a plurality of injection molds, tempering said parisons in at least one tempering mold to obtain uniform orientation conditions and orienting and expanding the tempered parisons to obtain the hollow articles, the improvement which comprises: providing a first group of tempering molds containing a number of mold cavities equal to the number of injection mold cavities, wherein said first group is in spaced relationship to said injection molds; transferring said parisons from said injection molds to said first group for tempering; tempering said parisons in said first group; providing a tempered parison storage facility for maintaining parisons in the fully tempered condition in spaced relationship to said first group and containing means to accommodate parisons equal to the number of cavities in said first group; transferring fully tempered parisons to said facility; maintaining said parisons in the fully tempered condition in said facility; providing a number of blow molds for final expansion in spaced relationship to said facility in an amount less than may be accommodated in said facility; transferring a first number of tempered parisons equivalent to the number of blow molds from said facility to said blow molds for orientation and expansion and orienting and expanding said first number; and transferring at least one second number of tempered parisons equivalent to the number of blow molds from said facility for orientation and expansion and orienting and expanding said second number.

2. A process according to claim 1 wherein said plastic is poly(ethyleneterephthalate).

3. A process according to claim 1 wherein said facility is tempering molds.

4. A process according to claim 1 wherein a second group of tempering molds is provided containing a number of mold cavities equal to the number of cavities in said first group and located in spaced relationship to said first group, wherein said parisons are transferred from said first group to said second group for continued tempering.

5. A process according to claim 1 wherein transfer means is provided for transferring said parisons from said facility to said blow molds.

6. A process according to claim 5 wherein said facility contains a number of mold cavities and means are provided associated with said facility for moving a portion of the mold cavities of said facility into and out of alignment with said transfer means.

7. A process according to claim 5 wherein said transfer means are moved into and out of alignment with a first number of parisons in said facility, and into and out of alignment with a second number of parisons in said facility.

8. A process according to claim 1 wherein the parisons are multilayered and the final articles are multilayered.

9. An apparatus for the preparation of oriented hollow articles of moldable organic plastic material in a rapid operating cycle including a plurality of injection molds for forming a plurality of parisons, a plurality of tempering molds for tempering the parisons to obtain uniform orientation conditions, and a plurality of blow molds for expanding the parisons to obtain the hollow articles, the improvement which comprises: a first group of tempering molds in spaced relationship to the injection molds, wherein said group contains a number of mold cavities equal to the number of injection mold cavities; means engageable with the parisons for transferring the parisons from the injection molds to said first group for tempering; a tempered parison storage facility for maintaining parisons in the fully tempered condition in spaced relationship to said first group and containing means to accommodate parisons equal to the number of cavities in said first group; means associated with said facility for maintaining parisons in the fully tempered condition therein; means engageable with said parisons for transferring fully tempered parisons to the facility; a number of blow molds for final expansion in spaced relationship to the facility in an amount less than may be accommodated in the facility; means engageable with a first number of tempered parisons in the facility equivalent to the number of blow molds for transferring same to the number of blow molds for orientation and expansion; and means engageable with at least one second number of tempered parisons in the facility equivalent to the number of blow molds for transferring same to the number of blow molds for orientation and expansion.

10. An apparatus according to claim 9 wherein the means engageable with the first and second number of parisons is a plurality of stretch-blow cores which form the tempered parisons into oriented, blown articles in the blow molds.

11. An apparatus according to claim 9 wherein said facility is tempering molds.

12. An apparatus according to claim 9 including a second group of tempering molds containing a number of mold cavities equal to the number of cavities in said first group and located in spaced relationship thereto, wherein said parisons are transferred from said first group to said second group for continued tempering.

13. An apparatus according to claim 10 wherein said facility contains a number of mold cavities and motive means is provided associated with said facility operative for moving a portion of the mold cavities of said facility into and out of alignment with the stretch-blow cores.

14. An apparatus according to claim 10 wherein motive means is provided associated with the stretch-blow cores operative for moving said cores into and out of alignment with a first number of parisons in said facility, and into and out of alignment with a second number of parisons in said facility.

15. An apparatus according to claim 9 wherein the parisons are multilayered and the final articles are multilayered.

* * * * *